United States Patent [19]

Ishikawa et al.

[11] Patent Number: 4,934,207
[45] Date of Patent: Jun. 19, 1990

[54] HYDRAULICALLY OPERATED TRANSMISSION WITH REVERSE TORQUE LIMITER

[75] Inventors: Keiichi Ishikawa; Kazuma Hatakeyama, both of Utsunomiya, Japan

[73] Assignee: Honda Giken Kogyo Kabushiki Kaisha, Tokyo, Japan

[21] Appl. No.: 279,691

[22] Filed: Dec. 5, 1988

[30] Foreign Application Priority Data

Dec. 5, 1987 [JP] Japan .................. 62-308398

[51] Int. Cl.⁵ .................. F16D 43/02; F16D 25/02
[52] U.S. Cl. .................. 74/364; 74/732.1
[58] Field of Search .................. 192/48.9, 48.92, 48.6, 192/87.18; 74/730, 731, 336 R, 325, 364

[56] References Cited

U.S. PATENT DOCUMENTS

| 4,219,109 | 8/1980 | Ushijima et al. | 192/87.18 X |
| 4,311,062 | 1/1982 | Hamada et al. | 192/48.6 X |

FOREIGN PATENT DOCUMENTS

| 51-31893 | 9/1976 | Japan . |
| 58-160654 | 9/1983 | Japan . |
| 594950 | 11/1947 | United Kingdom . |
| 595451 | 12/1947 | United Kingdom . |
| 706208 | 3/1954 | United Kingdom . |
| 797156 | 6/1958 | United Kingdom . |
| 841069 | 7/1960 | United Kingdom . |
| 1036210 | 7/1966 | United Kingdom . |
| 1241744 | 8/1971 | United Kingdom . |

Primary Examiner—Leslie A. Braun
Assistant Examiner—Khoi Q. Ta
Attorney, Agent, or Firm—Armstrong, Nikaido, Marmelstein, Kubovcik & Murray

[57] ABSTRACT

Hydraulically operated transmission having plural gear trains each selectively established by engagement of an associated hydraulic clutch. Each hydraulic clutch has an outer member and an inner member with the inner member being divided into at least a first inner part and a second inner part engaged in parallel with the outer member. A one-way clutch is interposed between the first inner part and the second inner part of each hydraulic clutch. The first inner part of each clutch is directly coupled to a member on one of the input side and the output side of the hydraulic clutch. The second inner part is connected to that member through the one-way clutch so that the one-way clutch allows overrotation of the second inner part when the member is on the input side and overrotation of the member when it is on the output side.

2 Claims, 2 Drawing Sheets

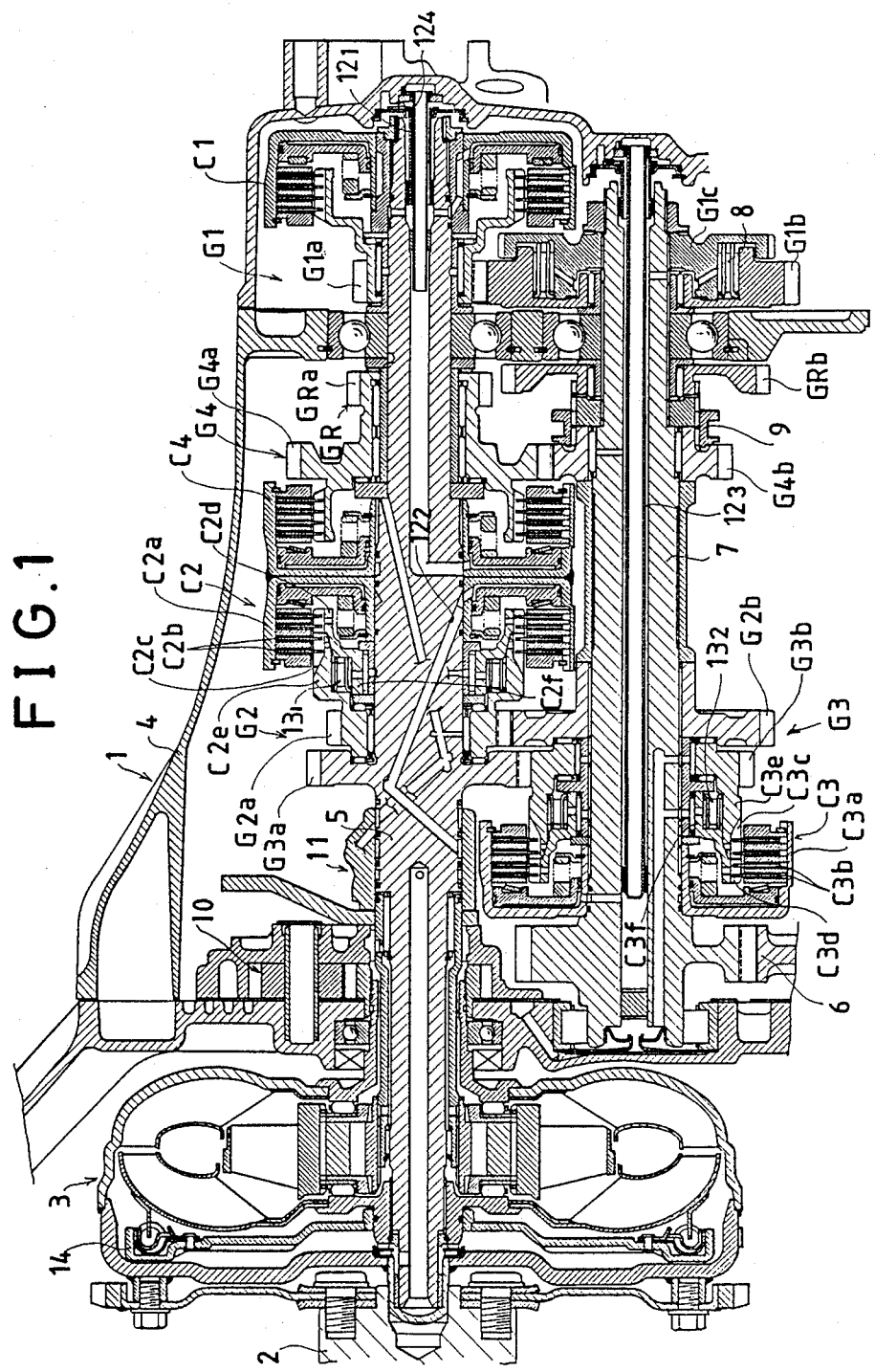

HYDRAULICALLY OPERATED TRANSMISSION WITH REVERSE TORQUE LIMITER

This invention relates to a hydraulically operated transmission mainly for automatic gear shifting in which each of a plurality of transmission trains is selectively established by engagement of a hydraulic clutch interposed in each of the trains.

In a transmission of this kind, when the speed of the vehicle is accelerated by a driver's upshift operation, say, from second speed to third speed and the third-speed hydraulic clutch interposed in the third speed gear train becomes engaged later than the second speed hydraulic clutch interposed in the second speed gear train is disengaged, a neutral state of the transmission temporarily occurs causing the engine to race. The conventional means generally adopted to overcome this problem is to cause the third speed hydraulic clutch to start engaging prior to disengagement of the second speed hydraulic clutch so as to produce a so-called state of concurrent coupling or engagement in which both of the hydraulic clutches are made to be concurrently exerting an engagement force in order to prevent engine racing.

In the concurrent engagement of the two clutches, the input shaft and output shaft of the transmission are coupled together through two gear trains that have different gear reduction ratios. Consequently, a braking force is applied against rotation of these shafts that corresponds to the engagement force of the hydraulic clutches in these two gear trains. This temporarily reduces the driving torque (rotating torque of the drive wheels), adversely effecting smoothness of the speed change operation. To avoid such a disadvantage, there has been disclosed a system, (such as proposed in the Japanese Patent Publication No. 21369/1973) in which the engagement force of the second-speed hydraulic clutch being disengaged is made to decrease rapidly with the rise to a predetermined level of the oil pressure in the third-speed hydraulic clutch being engaged so that an excessive concurrent engagement can be restrained.

The hydraulic pressure required for engagement of the hydraulic clutch varies depending on the magnitude of load. If the predetermined oil pressure is set at a low level, therefore, the second-speed clutch may become disengaged before the third speed clutch becomes securely engaged to produce a sufficient engagement force when the transmission is being shifted up from second to third speed under a high load condition, thus causing engine racing. On the other hand, if the predetermined oil pressure is set at a high level, disengagement of the second speed clutch during the upshift under a low or medium load condition is so delayed that there can occur an excessive concurrent engagement of the clutches. This in turn results in sharp reduction in the driving torque. It is therefore difficult to provide an arrangement such that an adequate concurrent engagement of clutches may be obtained under any one of various load conditions.

In the case of a kickdown from third speed to second speed in which a driver fully depresses the accelerator pedal, the third-speed clutch can be disengaged slightly earlier than engagement of the second-speed clutch to put the transmission in neutral temporarily so as to cause the engine to race to slightly increase its rpms so that the difference in rpm between the input side and the output side of the second-speed clutch is reduced for smooth engagement of the second-speed clutch, thus minimizing gear shift shocks.

However, if the transmission remains in neutral too long, the engine rpm increases to an excessively high level. To prevent this, charging and discharging of oil to and from the second-speed clutch and third-speed clutch is controlled so that the second-speed clutch may become engaged slightly before the difference in rpms between the input side and output side of the second-speed clutch becomes zero. As a result, when engagement of the second-speed clutch is being performed, the revolution speed of the input side of the clutch is forcibly increased from a lower level to that of the output side, so that all of the load for increasing rotations of all the rotating members ranging from said clutch to the engine should be taken on by the output side of the second-speed clutch. This results in a temporary sharp drop in the driving torque and therefore an unsmooth shifting of gears.

A transmission has been known which has a one-way clutch built into its first-speed gear train to allow over-rotation of the output side of the first-speed gear train. In such a transmission, during upshift from first speed to second speed, the second-speed clutch produces an engagement force even with the first-speed clutch still remaining engaged, causing the speed of revolution of the input shaft to decrease. The moment the speed of revolution of the input shaft starts decreasing as above, transmission of the driving force through the first-speed gear train is automatically eliminated by the action of the one-way clutch, so that simultaneous establishment of the first- and second-speed gear trains, that is, a concurrent coupling or engagement of the clutches for the two gear trains during the shift is prevented. This in turn prevents reduction in the driving torque which would otherwise be caused by simultaneous establishment of two gear trains, and thereby assures smooth upshifting. In case of downshift or kickdown from second speed to first speed, the disengagement of the second-speed clutch causes the engine to race and increase its speed of revolution. When the speed of revolution of the input side of the one-way clutch is increased with the engine racing so much as to almost exceed that of the output side, the one-way clutch becomes engaged to establish the first-speed gear train. Therefore, the output side of the transmission does not take on the load that caused the revolution speed of the input side to increase, thus providing a smooth gear shifting.

As mentioned above, with a gear train provided with a one-way clutch, reduction in the driving torque that can take place in the course of gear shifting is prevented to assure a smooth shifting of gears. However, the gear train provided with a one-way clutch cannot transmit a reverse driving torque from the drive wheel so that there arises a problem that engine braking does not work at all. Because of this problem, the one-way clutch cannot be incorporated in the second-speed and third-speed gear trains that are operated in the medium and high speed ranges.

In the above instance, it may be possible to provide, in parallel with the one-way clutch in the second-and third-speed gear trains, an engagement device which is directly connectable to both the input and output sides of the clutch so that, when a throttle opening is reduced to its lowest degree in order to effect engine braking, the engagement device is activated to directly couple the input side and the output side of the one-way clutch for transmitting the reverse driving torque from the output side to the input side. This, however, results in many problems such as an increase in the size and weight of the transmission due to addition of the engagement device and a complicated structure of the hydraulic control device.

Japanese Patent Publication No. 31893/1976 discloses a multiple disk clutch used in the main clutch interposed between a motorcycle engine and its transmission. The multiple disk clutch is arranged such that an outer member thereof is coupled to the engine. An inner member thereof to be engaged with the outer member through multiple clutch disks is divided into at least two parts. The first inner part, which is one of the two divided parts of the inner member, is directly connected to the input shaft of the transmission. The second or other part thereof is connected to the input shaft through a one-way clutch that allows overrotation of the input shaft of the transmission. In this clutch, when a counter load is applied to the input shaft of the transmission due to downshift of the speed change gear, the second inner part of the clutch does not convey the counter load due to the action of the one-way clutch, so that the counter load is transmitted to the engine only through the first inner part. Since the engagement force of the first inner part is half the total engagement force of the clutch as a whole, the first inner part of the clutch slips relative to the outer member of the clutch with the slipping absorbing the counter load so as to prevent the chain or transmission from being broken or damaged due to the counter load.

SUMMARY OF THE INVENTION

This invention makes use of the above multiple disk clutch technology to provide a hydraulically operated transmission which provides a smooth gear shifting without producing any of the above-mentioned problems experienced with the conventional transmissions that use a one-way clutch and an engagement device arranged in parallel therewith.

To achieve the above objective, the present invention provides a hydraulically operated transmission in which each of plural gear trains is selectively established through engagement of a hydraulic clutch interposed therein, the transmission comprising:

hydraulic clutches interposed in all or some of the gear trains;

each of the hydraulic clutches having an outer member and an inner member, the inner member being further divided into at least two parts—first and second parts—so that they can engage parallel with the outer member of the clutch; and a one-way clutch interposed between the first and second inner parts of each of the hydraulic clutches The first inner part of the hydraulic clutch is directly coupled to a member on the input side or the output side of the hydraulic clutch. The second inner part of the hydraulic clutch is connected to that member through the one-way clutch so that the one-way clutch allows overrotation of the second inner part when the member is on the input side or overrotation of the member when it is on the output side.

In the following description, the operation of the transmission during upshift and downshift between the second and third speeds is set forth using a transmission in which the second-speed hydraulic clutch interposed in the second-speed gear train has two inner parts for its inner member.

The second-speed hydraulic clutch has its outer member connected to the input-side member. The first inner part of the inner member of the clutch is directly coupled to the output-side member and the second inner part is connected to the output-side member through a one-way clutch that permits overrotation of the member.

During upshift from second to third speed, the third-speed clutch starts engaging before the second-speed clutch is disengaged, as explained above, to bring about a concurrent engagement of the two clutches and thereby prevent an excessive rise in engine rpm.

As the third-speed clutch begins to engage and the revolution speed of the input side of the second-speed clutch decreases, the one-way clutch is disengaged. As a result, the second-speed gear train is established and maintained by virtue of the engagement force of only the first inner part of the clutch, so that the engagement force of the second-speed clutch is virtually halved, thus sharply increasing the slippage of the clutch.

This substantially reduces the braking effect caused by the concurrent engagement of the two clutches, minimizing the reduction in the driving torque during the process of gear shift. This in turn results in a smooth upshift.

If the second-speed clutch is so arranged that, during downshift from third speed to second speed, as with the conventional transmission, it starts to engage after the disengagement of the third-speed clutch but before the revolution speed of the input side becomes equal to that of the output side, the one-way clutch does not engage until such time that the revolution speed of the input side is increased up to the revolution speed of the output side after the second-speed clutch has started to engage. During this period, the engagement force of the second-speed clutch is provided only by the engagement of the first inner part, so that the second-speed clutch easily slips, such slippage resulting in alleviation of the load taken on by the output side to increase the revolution speed of the input side. This in turn prevents a sharp decrease in the driving torque. When the revolution speed of the input side is increased to that of the output side, the one-way clutch engages to increase the engagement force of the second-speed clutch to a level high enough to convey the torque necessary for acceleration. Thus, downshift is performed far more smoothly than the conventional transmission.

When engine braking is applied, the counter driving torque is transmitted only through the engagement of the first inner part of the clutch. Since the engagement force of the hydraulic clutch to be obtained when the clutch is completely engaged is set at a level high enough to carry the maximum torque of the engine and the counter driving torque is far smaller compared to the maximum engine torque, the clutch retains a sufficiently high engagement force to convey the reverse driving torque even when the engagement force is halved. Therefore, the effectiveness of engine braking will not be decreased.

During either an upshift or a downshift between second speed and third speed, it is the second-speed clutch incorporated in the second-speed gear train for the lower speed range that is functionally effective in assuring the smooth gear shifting, as described in the foregoing. Thus, it would not make sense to have a hydraulic clutch in the top speed gear train provided with a one-way clutch for the purpose of securing smooth gear shifting, as in the case of the foregoing second-speed hydraulic clutch.

However, when during high-speed driving the select lever of the transmission is operated for switchover to the neutral position and then to the automatic drive position again, it can happen that the hydraulic clutch of the top speed gear train is supplied with hydraulic oil at the time of such switchover operation. If this select lever operation is done under a condition in which an accelerator pedal is released to lower the engine rpm, the output side is caused to take on the load of bringing up the revolution speed of the input side when the clutch establishes the engagement. To minimize an engagement shock by alleviating drastic change in the driving torque caused by that load, the clutch for the top speed gear train may be provided with a one-way clutch.

When the clutch is so disposed as to have its outer member coupled to a member on the output side, the first inner part of the inner member of the clutch is then directly coupled to a member on the input side and the second inner part is connected to that member on the input side through the one-way clutch that permits overrotation of the second inner part. It is also so arranged that, as long as the revolution speed of the input-side member is lower than that of the second inner part located on the output side with respect to the input-side member, the one-way clutch may not be engaged, thereby producing a similar action mentioned above.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is a longitudinal sectional view of a transmission according to one embodiment of the invention.

DETAILED DESCRIPTION OF A PREFERRED EMBODIMENT

Figure 2A:
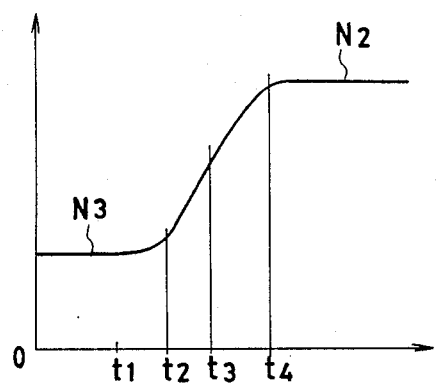
FIG. 2(a), 2(b) and 2(c) are diagrams showing respectively a revolution speed change characteristic of the input shaft during down-shift from third speed to second speed, hydraulic pressure change characteristics of the second-speed clutch and the third-speed clutch, and a change characteristic of the driving torque.

Referring to FIG. 1, a transmission 1 is connected through a torque converter 3 to a crank shaft 2 of the engine. The transmission 1 has a parallel two-shaft construction in which an input shaft 5 connected to the torque converter 3 and an output shaft 7 coupled to an output gear 6 linked with driving wheels of a vehicle are parallel supported in a transmission case 4. Between the two shafts 5 and 7 are parallel installed forward gear trains G1, G2, G3, G4 for first through fourth speed and a reverse gear train GR. Each of the forward trains G1, G2, G3, G4 is inserted with the corresponding one of plural hydraulic clutches C1, C2, C3, C4, so as to form a hydraulic transmission comprising four forward speeds and one reverse.

To describe it in more detail, the first-speed gear train G1 consists of a first-speed hydraulic clutch C1 on the input shaft 5, a drive gear G1a coupled to the clutch C1, a driven gear G1b meshed with the drive gear G1a, and a parking gear G1c secured to the output shaft 7. Between the driven gear G1b and the parking gear G1c is interposed a one-way clutch 8 which permits overrotation of the parking gear G1c on the output side. As explained above, the one-way clutch 8 works to permit smooth upshift from or downshift to the first-speed gear train.

The second-speed gear train G2 consists of a second-speed hydraulic clutch C2, a drive gear G2a coupled to this clutch C2, and a driven gear G2b which is fixedly secured to the output shaft 7 and in mesh with the drive gear G2a. The third-speed gear train G3 consists of a drive gear G3a formed integrally with the input shaft 5, a driven gear G3b which is in mesh with the drive gear G3a, and a third-speed hydraulic clutch C3 on the output shaft 7 coupled to the driven gear G3b. The fourth-speed gear train G4 consists of a fourth-speed hydraulic clutch C4 on the input shaft 5, a drive gear G4a coupled to the clutch C4, and a driven gear G4b being in mesh with the drive gear G4a. Formed integrally with the drive gear G4a is a drive gear GRa of the reverse gear train GR. A driven gear GRb of the reverse gear train GR, which is in mesh with the drive gear GRa through an idler gear (not shown), and the driven gear G4b of the fourth-speed gear train G4 are selectively connected to the output shaft 7 by moving a selector gear 9 on the output shaft 7 to the reverse drive position on the right in the drawing or to the forward drive position on the left (at which position the selector 9 is shown). With the selector gear 9 switched over to the reverse drive position, hydraulic oil is supplied to the fourth-speed clutch C4 to establish the reverse gear train GR.

An oil pump 10 is provided in the transmission case 4 at the end on the engine side. A valve block 11 is provided which incorporates various valves including manual valves and shift valves. When the select lever in the driver's compartment is manipulated to set the manual valve to the automatic drive position for forward travel of the vehicle, the pressure oil from the pump 10 is first supplied to the first-speed hydraulic clutch C1 through a pipe $12_1$ which is mounted in the end wall of the transmission case 4 and inserted into the input shaft 5, thus establishing the first-speed gear train G1. Then as the vehicle speed is increased to enter the second-speed range, the pressure oil is supplied to the second-speed hydraulic clutch C2 through an oil path $12_2$ formed in the input shaft 5, thereby establishing the second-speed gear train G2. As the vehicle speed is further increased to enter the third-speed range, the second-speed hydraulic clutch C2 gets the oil discharged therefrom and at the same time the third-speed hydraulic clutch C3 is supplied with the pressure oil through a pipe $12_3$ which is mounted in the end wall of the transmission case 4 and inserted into the output shaft 7, thus establishing the third-speed gear train G3. With the vehicle speed further increased to enter the fourth-speed range, the oil is discharged from the third-speed clutch C3 and at the same time supplied to the fourth-speed hydraulic clutch C4 through a pipe $12_4$ located inside the pipe $12_1$ which is mounted in the end wall of the transmission case 4 and inserted into the shaft 5. As a result, the fourth-speed gear train G4 is established. During the forward driving, the selector gear 9 is at the forward drive position and the first-speed hydraulic clutch C1 is kept charged with the pressure oil so that it remains engaged.

Here, each of the second and third-speed hydraulic clutches C2, C3 has the inner member divided into two parts, the first inner part C2c for the former or C3c for the latter and the second inner part C2d for the former or C3d for the latter, which are so arranged that they may parallelly engage with the outer member C2a or C3a of each clutch through two disks C2b, C3b. The first inner part C2c of the second-speed hydraulic clutch C2 is directly coupled to the drive gear G2a of the second-speed gear train G2, said gear G2a being a member on the output side of the clutch C2. The second inner part C2d of the second-speed hydraulic clutch C2 is connected to the drive gear G2a through a one-way clutch $13_1$ which allows overrotation of the gear G2a. The first inner part C3c of the third-speed hydraulic clutch C3 is directly connected to the driven gear G3b of the third-speed gear train G3, said gear G3b being a member on the input side of the clutch. The second inner part C3d of the clutch C3 is connected to the driven gear G3b through a one-way clutch $13_2$ which permits overrotation of the second inner part C3d.

In the example shown in the accompanying drawings, there is formed with each of the first inner parts C2c, C3c, of the second and third-speed hydraulic clutches C2, C3 a relatively large-diameter cylindrical portion C2e or C3e which is integral with the corresponding gear G2a, G3b while there is formed with each of the second inner parts C2d, C3d a relatively small-diameter cylindrical portion C2f or C3f which is accommodated in one of the large cylindrical portions C2e, C3e. The one-way clutch $13_1$ is then interposed between the two cylindrical portions C2e and C2f of the second-speed hydraulic clutch C2 and the one-way clutch $13_2$ is interposed between the two cylindrical portions C3e and C3f of the third-speed hydraulic clutch C3 respectively so as to make these hydraulic clutches C2, C3 as compact as possible.

A lockup clutch 14 is built into the torque converter 3.

Now, the operation of the above embodiment will be explained.

Figure 2C:
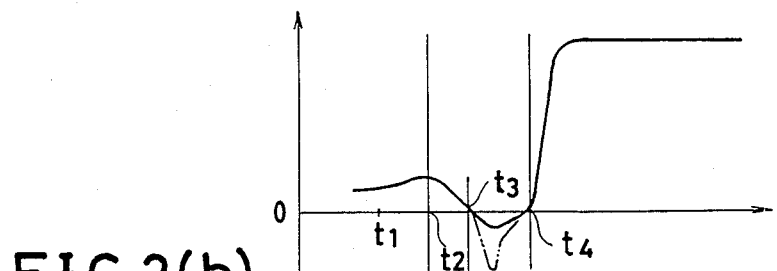
Figure 2B:
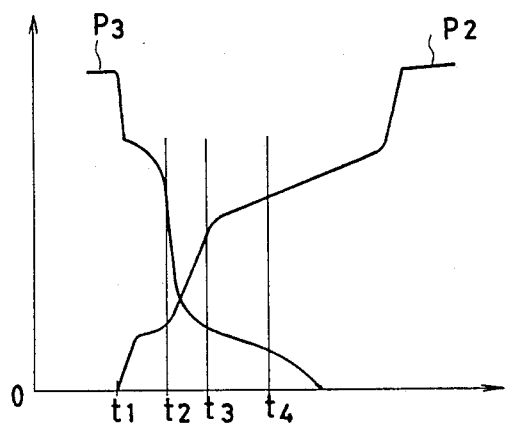

Referring to FIGS. 2(a), 2(b), and 2(c), a case is first considered where at time t1, the third-speed hydraulic clutch C3 begins to be discharged of oil and the second-speed hydraulic clutch C2 begins to be charged with pressure oil to perform a downshift from third speed to second speed. In this case, as shown in FIG. 2(b), the oil pressure P3 of the third-speed clutch C3 drops relatively quickly, so that the clutch C3 becomes virtually disengaged at time t2. However, the oil pressure P2 of the second-speed clutch C2 increases relatively slowly, so that the second-speed clutch C2 starts to engage at time t3, which is slightly after the time t2. During the period between t2 and t3, the transmission is therefore in the neutral state causing the engine to race, so that the revolution speed of the input shaft 5 starts to increase as shown in FIG. 2(a). At the same time, because the power from the engine is not transmitted to the output shaft 7, the driving torque begins to fall toward zero, as shown in FIG. 2(c).

If N stands for the revolution speed of the output shaft 7 at time of downshift, N3 and N2 for the revolution speed of the input shaft before and after the down shift, and r3 and r2 (r3<r2) for reduction ratios of the third-speed and second-speed gear trains G3 and G2 respectively, then the following relation holds.

$$N = \frac{N3}{r3} = \frac{N2}{r2}$$

Thus,

-continued
$$N2 = \frac{r2}{r3} N3$$

This means that until the revolution speed of the input shaft 5 increases to N2, the revolution speeds of the input side and the output side of the second-speed hydraulic clutch C2 do not coincide with each other.

At time t3, the revolution speed of the input shaft 5 has not yet increased to N2, so that the output shaft 7 will have to take on the burden of bringing up the revolution speed of the input shaft 5 to N2 through the second-speed clutch C2. This will cause the driving torque to decrease so much as to give a negative value. However, during this period, the drive gear G2a on the output side of the one-way clutch $13_1$ is rotating at a higher speed than the second inner part C2d on the input side, so that the one-way clutch $13_1$ does not engage and the engagement force of the second-speed clutch C2 is reduced to a half of its full possible value in that it is derived only from the engagement of the first inner part C2c. Thus, the load taken on by the output shaft 7 decreases. The driving torque produced when the engagement force of the second-speed clutch C2 is not halved shows a sharp drop as indicated by an imaginary line of FIG. 2(c). On the other hand, the driving torque in this embodiment is prevented from falling as sharply as shown in the solid line.

As the input shaft 5 increases its revolution speed, the driving torque also increased toward zero. At time t4 when the input shaft revolution speed has reached N2, the one-way clutch $13_1$ engages, after which time the engagement force of the second-speed clutch C2 rapidly increases to a value amounting to the sum of the engagement forces of the first and second inner parts C2c, C2d of the clutch C2. At the same time, the driving torque also sharply increases to a value that is normally provided by the second-speed gear train G2.

When the gear is shifted up from second speed to third speed, the oil pressure in the second-speed clutch C2 is lowered relatively slowly so that the second-speed clutch C2 may be disengaged only after the third-speed clutch C3 starts to engage. During this process concurrent coupling or engagement of the two clutches C2 and C3 occurs temporarily. However, as the revolution speed of the input shaft 5 begins to decrease with the third-speed hydraulic clutch C3 starting to engage, the revolution speed of the second inner part C2d on the input side of the one-way clutch $13_1$ becomes lower than that of the drive gear G2a on the output side so that the one-way clutch $13_1$ is disengaged immediately with the result that the engagement force of the second-speed clutch C2 is reduced to a half in that it is provided only by the first inner part C2c of the clutch C2. Under this condition, the clutch C2 easily slips, thereby restraining the braking effect on the input and output shafts 5, 7 which can be caused by the concurrent engagement of the two clutches. This assures smooth upshifting without the racing of the engine and/or a sharp reduction in the driving torque.

During an upshift or a downshift between third speed and fourth speed, the one-way clutch $13_2$ interposed between the second inner part C3d of the third-speed clutch C3 and the driven gear G3b functions the same way as described above with respect to the one-way clutch $13_1$. That is, when concurrent engagement of the two clutches occurs during an upward shift or when the revolution speed of the input shaft 5 is increased during a downward shift, the engagement force of the third-speed clutch C3 is reduced to one half in that the engagement force is then derived only from the first inner part C3c of the clutch C3, thus assuring a smooth gear shifting as described with respect to the shifting between second speed and third speed.

When engine braking is applied by releasing the accelerator pedal while the vehicle is running in second- or third-speed gear, the corresponding one-way clutch $13_1$ or $13_2$ becomes disengaged and the engagement force of the second- or third-speed clutch C2 or C3 is halved. However, as are the first- and fourth-speed clutches C1, C4, these clutches C2 and C3 are designed so that they may provide an engagement force large enough to satisfactorily transmit the maximum output torque of the engine when they have attained a state of the full engagement in which the oil pressure thereof has risen to the predetermined pressure level. Since the counter driving torque that occurs when engine braking is being applied is far smaller than the maximum output torque, the reduction to a half of the clutch engagement force will not result in reduced effectiveness of engine braking.

If it is so arranged that the second-speed clutch C2 or the third-speed clutch C3 may become engaged as soon as the select lever is switched over from the neutral position to a drive position such as an automatic drive position, under the condition that the accelerator pedal is released while the vehicle is running, the output side of the clutch will have to take on the load to increase the revolution speed of the input side. Through the operation of the one-way clutch $13_1$ or $13_2$ built into the clutch C32 or C3, the slip of the clutch during the course of engagement increases, thus alleviating a drastic change in the driving torque that would otherwise result from the load required to increase the revolution speed of the input shaft. This minimizes shocks.

Such alleviation of shocks obtained in the above gearshift operation from the neutral position can also be obtained during the course of engagement of the fourth-speed clutch C4 simply by providing the fourth-speed clutch C4 with a one-way clutch designed in the same manner as the second-speed clutch.

As described above, simple structural changes in the hydraulic clutches as proposed by this invention can provide smooth gear shifts by making the most of the one-way clutch, without deteriorating the engine braking performance. The construction of the invention also reduces shocks that occur when the select lever is shifted from the neutral position to the drive position with the accelerator pedal released while the car is running. The invention therefore has the advantage of being able to provide a high performance transmission without making substantial changes in the transmission and the associated hydraulic control system.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulically operated transmission comprising plural gear trains;
   hydraulic clutches interposed in at least one of the gear trains for selectively establishing engagement thereof;
   each of the hydraulic clutches having an outer member and an inner member, the inner member being further divided into at least a first inner part and a second inner part engaged in parallel with the outer member of each of the hydraulic clutches; and
   a one-way clutch interposed between the first and second inner parts of each of the hydraulic clutches;
   whereby the first inner part is directly coupled to an element on one of an input side and an output side of each of the hydraulic clutches, and the second inner part is connected to said element through the one-way clutch so that the one-way clutch allows overrotation of the second inner part when the element is on the input side and overrotation of the element when the element is on the output side.

2. A hydraulically operated transmission as set forth in claim 1, wherein one of the first and second inner parts of the hydraulic clutch has a cylindrical portion of a relatively large diameter formed integrally therewith and the other inner part of the hydraulic clutch has a cylindrical portion of a relatively small diameter formed integrally therewith and inserted into said large-diameter cylindrical portion of said one inner part, and the one-way clutch is interposed between these two cylindrical portions.

* * * * *